Patented May 3, 1949

2,468,748

UNITED STATES PATENT OFFICE 2,468,748

DRYING OIL-STYRENE INTERPOLYMERS

Gerald A. Griess and Arthur S. Teot, Midland, Mich., assignors to The Dow Chemical Company, Midland, Mich., a corporation of Delaware No Drawing. Application September 26, 1947, Serial No. 776,400

13 Claims. (Cl. 260—23)

This invention concerns certain new interpolymers of: (1) one or more monovinyl aromatic compounds having the general formula:

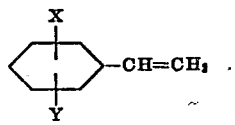

wherein X and Y represent the same, or different, members of a group consisting of hydrogen, halogens, and lower alkyl radicals containing not more than three carbon atoms; (2) an alpha-methylene alkyl aromatic compound having the general formula:

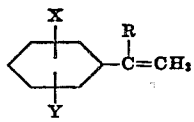

wherein X and Y have the meaning just given and R is a lower alkyl radical containing not more than two carbon atoms; and (3) a drying oil, or a mixture of drying oils, of a quality hereinafter specified. The new interpolymers are soluble in toluene and in various other organic solvents, e. g. benzene, xylene, or solvent naphtha, etc., and are useful as varnish resins. The invention also pertains to a method of making the interpolymers.

It is known that varnish resins may be prepared by the interpolymerization of drying oils with styrene. However, when attempt is made to carry out the interpolymerization in bulk, i. e. in the absence of solvents or other media, at elevated temperatures in order to reduce the reaction time to a commercially acceptable period, an extremely vigorous exothermic, or "runaway," polymerization often occurs. The temperature may rise quickly to the boiling point of the mixture and a considerable part of the styrene monomer be lost. Not only is careful control of the process impossible, but the resulting interpolymer is not as soluble in aliphatic solvents as is desired for general use in varnishes and paints.

It has now been found that the tendency of a mixture of a drying oil and styrene, or a nuclear-substituted styrene, to undergo excessive temperature rise during polymerization may be restrained by carrying out the polymerization in the presence of an alpha-methylene alkyl aromatic compound having the above general formula, preferably alpha-methyl styrene. The alpha-methylene alkyl aromatic compound appears not only to modify the rate of the polymerization reaction, but also to interpolymerize with the drying oil and the styrene, or nuclear-substituted styrene. It reduces the tendency, when using partially conjugated drying oils in the polymerization mixture, toward formation of highly cross-linked polymeric products which are insoluble in toluene and other usual varnish solvents and which are therefore unsuitable for use as varnish resins. However, in order to avoid formation of a gel of such insoluble, highly cross-linked polymer, particularly when carrying the polymerization out in the substantial absence of inert liquid media such as benzene, toluene, or xylene, etc., we have found it advisable that the several polymerizable starting materials be used in certain relative proportions and important that the drying oil, or mixture of drying oils, employed as a starting material have an average of not more than 35 per cent of the olefinic linkages thereof conjugated with respect to one another. For convenience, the per cent of the total number of olefinic linkages in a drying oil which are conjugated is hereinafter referred to as the "degree of conjugation" of the oil.

Any drying oil, or mixture of drying oils, having a degree of conjugation not greater than 35 per cent, may be employed in preparing the new toluene-soluble interpolymers. Examples of suitable drying oils are linseed oil, soybean oil, dehydrated castor oil, perilla oil, and fish oils such as sardine oil. Mixtures of one or more of the unconjugated oils, or oils of low degree of conjugation, just mentioned, with one or more highly conjugated drying oils such as tung oil or oiticica oil may also be used, provided such oil mixture has an average degree of conjugation not greater than 35 per cent. Employment of more highly conjugated drying oils frequently results in production of toluene-insoluble polymeric products. Drying oils, or drying oil mixtures, of not more than 30 per cent conjugation are preferably used. In general, unbodied raw and refined oils are superior to bodied oils, but the latter may sometimes be used.

As the monovinyl aromatic component of the new interpolymers, styrene is preferred, but other polymerizable monovinyl aromatic compounds such as ortho-methyl styrene, para-methyl styrene, ortho-ethyl styrene, para-ethyl styrene, ortho,para-dimethyl styrene, ortho,para-diethyl styrene, para-chlorostyrene, meta-chlorostyrene, ortho-methyl-para-chlorostyrene, ortho-ethyl-para-chlorostyrene, ortho-methyl-para-isopropyl styrene, etc., may be employed.

Alpha-methyl styrene is preferably used as the alpha-methylene alkyl aromatic component of the interpolymers. However, other alpha-methylene alkyl aromatic compounds such as para-methyl alpha-methyl styrene, alpha-ethyl styrene, ortho,para-dimethyl alpha-methyl styrene, meta-chloro alpha-methyl styrene, para-chloro alpha-methyl styrene, para-isopropyl alpha-methyl styrene, or meta-chloro-para-methyl alpha-methyl styrene, or mixtures of any of these compounds with one another, or with alpha-methyl styrene, may be used.

From 0.2 to 1, usually from 0.25 to 0.67, part by weight of the alpha-methylene alkyl aromatic starting material, e. g. alpha-methyl styrene, is employed per part of the monovinyl aromatic component of the mixture subjected to polymerization; i. e. the alpha-methylene alkyl aromatic compound is used in a proportion corresponding to between approximately 16.7 and 50, preferably between 20 and 40 per cent of the combined weight of the same and the monovinyl aromatic starting material. The drying oil, or mixture of drying oils, of not greater than 35 per cent conjugation is used in amount corresponding to from 30 to 90 per cent of the total weight of the several polymerizable starting materials, the monovinyl aromatic and alpha-methylene alkyl aromatic components making up the remaining 10 to 70 per cent by weight of said materials. Varnish resins having optimum properties have been obtained by the interpolymerization of styrene, alpha-methyl styrene, and dehydrated castor oil, or linseed oil in relative proportions such that the drying oil represented from 50 to 60 per cent of the total weight, the balance being a mixture of the styrene and alpha-methyl styrene, which latter mixture contained about 70 per cent by weight of styrene.

The polymerizable starting materials in the relative proportions just given are preferably polymerized in a closed container or in contact with an inert atmosphere, e. g. of nitrogen, or methane, etc., in the substantial absence of inert liquid media such as benzene, toluene, or xylene, etc., so as to obtain the polymeric product directly in a concentrated form which may be dissolved in any suitable media to form a varnish of a desired concentration and composition. However, the polymerization may be carried out with limited access of air, e. g. by way of a reflux condenser, to the mixture. In practice, the drying oil, the monovinyl aromatic compound, e. g. styrene, and the alpha-methyl alkyl aromatic compound, preferably alpha-methyl styrene, are mixed together in the desired proportions, and the mixture is heated at a temperature below its atmospheric boiling point until the polymerization is substantially complete. Temperatures above 120° C. are required for rapid reaction. Temperatures of from 150° to 200° C. are generally preferred, but higher temperatures, e. g. up to 300° C., may be employed. The mixture should not be heated to a temperature sufficient to cause decomposition of the product. The interpolymerization proceeds smoothly without occurrence of an excessive temperature rise. It is usually complete after from 10 to 50 hours of heating, depending on the temperature at which the reaction is carried out.

If desired, the rate of interpolymerization may be increased by adding to the starting mixture a small proportion, e. g. from 0.5 to 3 per cent by weight, of a peroxide polymerization catalyst, such as benzoyl peroxide, acetyl benzoyl peroxide, tertiary butyl perbenzoate, and tertiary butyl hydroperoxide, etc. Employment of a catalyst is of further advantage in that it permits rapid production of clear resins using the polymerizable starting materials in relative proportions which may be varied over somewhat wider ranges than is possible without the use of a catalyst.

In preparing certain interpolymers, particularly those in which linseed oil, or other unconjugated oil, is employed as the drying oil component, the clarity and solubility of the resulting resins are affected materially by the manner in which the constituents of the interpolymerizing mass are mixed together. Best results are obtained when the drying oil is first heated to the polymerization temperature, and a mixture of the monovinyl aromatic compound, e. g. styrene, the alpha-methylene alkyl aromatic compound, e. g. alpha-methyl styrene, and a catalyst is added gradually over a period of several hours.

Although the interpolymers of the invention are preferably prepared by polymerization in bulk, they may also be produced by interpolymerizing the starting materials while dissolved in an inert solvent or while dispersed in an aqueous emulsion thereof.

The interpolymers produced by the method just described are clear resins which are readily soluble in aromatic solvents, or mixtures of aromatic and aliphatic solvents, e. g. mineral spirits, and are somewhat soluble in aliphatic solvents alone. They are compatible with linseed oil and with many other varnish resins, such as most phenolic resins and modified phenolic resins, and some modified alkyd resins, rosin-ester, paracoumarone-indene resins, urea resins, and melamine resins. They may be made up in a conventional manner into varnishes that dry rapidly in air to produce clear films of acceptable hardness. They are of particular value in formulating architectural finishes.

If it is desired to increase the viscosity and hardness of the interpolymers, and to decrease their drying time somewhat, the interpolymers of the invention may be bodied by heating the same for several hours at temperatures above 250° C. but below their decomposition temperatures, suitably at from 275° to 295° C.

The following examples illustrate a number of ways in which the principle of the invention has been applied, but are not to be construed as limiting the scope of the invention.

EXAMPLE 1

Unbodied dehydrated castor oil, having the following constants, as determined by conventional tests: iodine number 142; saponification number 190; acid number 4.5; unsaponifiable 0.3, was employed in preparing a resin. A mixture of 48 parts by weight of this oil with 35 parts of styrene, 15 parts of alpha-methyl styrene, and 2 parts of benzoyl peroxide was heated at 150° C. for 50 hours. There was no "runaway" reaction. The product was a clear yellowish resin containing 2.0 per cent volatile unpolymerized material and having a viscosity somewhat greater than Z-6 (Gardner-Holdt scale).

A varnish was made up by dissolving one part by weight of the resin in one part of a solvent consisting of two parts of mineral spirits (an aliphatic hydrocarbon varnish solvent) and one part of xylene, and adding as driers 0.02 per cent cobalt, 0.005 per cent manganese, and 0.15 per cent lead as the naphthenates, together with 0.1 per cent guaiacol to prevent skinning.

Films of this varnish show good adhesion to metals, high water resistance, pale color and good color retention, and excellent durability.

EXAMPLE 2

A charge of 48 parts of alkali refined linseed oil was heated at 150° C. and a mixture of 35 parts of styrene, 15 parts of alpha-methyl styrene, and 2 parts of tertiary butyl perbenzoate was added continuously over a period of 7 hours. Heating was then continued for 17 hours more at 150° C. and a further 24 hours at 200° C.

The resulting interpolymer was a clear resin containing 2.7 per cent volatile matter. It was freely soluble in alkali refined linseed oil.

A varnish containing 60 per cent solids was made up by dissolving the resin in a mixture of equal parts of mineral spirits and toluene, and metallic naphthenate driers were added as follows: cobalt 0.02 per cent, manganese 0.01 per cent, lead 0.15 per cent. This varnish had a viscosity of A (Gardner-Holdt), a color of 7-8 (Gardner), and a specific gravity of 0.92. When spread on glass, the varnish dried set in 3 minutes, tack-free in 26 minutes, and hard in 4 hours. The films were water-white, and of good clarity, hardness, and flexibility.

EXAMPLE 3

A mixture of 53 parts of dehydrated castor oil as in Example 1, 31.5 parts of styrene, 13.5 parts of alpha-methyl styrene and 2 parts of benzoyl peroxide was heated at 150° C. for 1.0 hour and then at 210° C. for 6 hours.

An enamel was prepared by mixing one part of the resulting interpolymer with one part of titanium dioxide pigment and one part of a mixture of mineral spirits and toluene in equal proportions. After air drying and aging 24 hours, films of this enamel exhibited a Taber shear hardness of 444.

EXAMPLE 4

A resin was prepared by interpolymerization of 38 parts of dehydrated castor oil, 42 parts of styrene, 18 parts of alpha-methyl styrene, and 2 parts of benzoyl peroxide according to the heating schedule of Example 3. A varnish made up from this resin according to the procedure of Example 2 had a viscosity (Gardner-Holdt) of E-F and a color of 4-5 (Gardner). It dried hard in 2.4 hours.

EXAMPLE 5

A charge of 68 parts of alkali refined linseed oil was heated at 160° C. and a mixture of 21 parts of styrene, 9 parts of alpha-methyl styrene and 2 parts of benzoyl peroxide was added over a period of 9.5 hours, after which the mixture was heated at 200° C. for 14.5 hours. The resulting resin was then bodied by heating at 295° C. for 5 hours.

When made up into a varnish, this resin gave water-white films of good clarity, hardness and flexibility.

EXAMPLE 6

In each of a series of experiments, a mixture of 35 parts by weight of styrene, 15 parts of alpha-methyl styrene, 2 parts of benzoyl peroxide and 48 parts of a mixture of linseed oil and tung oil was polymerized. The relative proportions of the linseed oil and the tung oil were varied in the different experiments. The following table gives the proportion of each drying oil in terms of per cent of the weight of the entire mixture subjected to polymerization. It also gives an approximate average value for the degree of conjugation of the mixture of drying oils employed in each experiment. Each polymerization was accomplished by heating the starting mixture in a vessel, provided with a reflux condenser, at 150° C. and then at 200° C. for the respective periods indicated in the table. In one instance the polymerization resulted in formation of an opaque gel which was substantially insoluble in toluene and was not adapted for use as a varnish resin. In all other instances the products were clear, transparent resins which were nearly colorless and were readily soluble in toluene. The table indicates which polymers were soluble in toluene.

*Table I*

| Run No. | Drying Oil Components | | | Hrs. of Heating at— | | Solubility of Product |
|---|---|---|---|---|---|---|
| | Linseed Oil | Tung Oil | Av. Degree of Conjugation | 150° C. | 200° C. | |
| | Per cent | Per cent | | | | |
| 1 | 43.2 | 4.8 | 9 | 3 | 21 | Soluble. |
| 2 | 38.4 | 9.6 | 17 | 3 | 21 | Do. |
| 3 | 38.4 | 9.6 | 17 | 0.5 | 23.5 | Do. |
| 4 | 36.0 | 12.0 | 21 | 4 | 20 | Do. |
| 5 | 33.6 | 14.4 | 26 | 3 | 21 | Do. |
| 6 | 31.2 | 16.8 | 30 | 2 | 22 | Do. |
| 7 | 28.8 | 19.2 | 34 | 3 | 21 | Do. |
| 8 | 24.0 | 24.0 | 43 | 1 | Gelled | Insoluble. |

It will be noted that with increase in the average degree of conjugation of the drying oils, from one experiment to the next, a point is reached beyond which the polymerization produces insoluble gels unsuited for use as varnish resins. In general, the use of drying oils having an average degree of conjugation of 35 per cent or less permits production of toluene-soluble resins suitable for use in varnishes.

EXAMPLE 7

The resinous interpolymers obtained in runs 1-7 of Example 6 were dissolved in separate portions of a mixture of equal parts by volume of toluene and mineral spirits (boiling at temperatures of from 155° to 210° C. at atmospheric pressure) to form a solution containing approximately 60 per cent by weight of the interpolymer. Steel panels were dipped in the resultant solution, removed, and solvent was permitted to evaporate from the varnish film thus deposited on the panels. One of the panels coated with a given interpolymer was permitted to dry to a tack-free condition by standing at room temperature in contact with air. Another panel coated with the same interpolymer was cured by heating the same at 120° C. for from 2 to 6.5 hours. All of the panel coatings thus cured at room temperature, or by heating, were free of tack at room temperature. The cured films adhered tightly to the panels and were clear and transparent. The films which were dried and cured at room temperature were substantially colorless. Those cured by heating possessed a slight yellowish tint.

EXAMPLE 8

In each of a series of experiments a mixture of styrene, alpha-methyl styrene, linseed oil and tung oil, which mixture contained 2 per cent by weight of dissolved benzoyl peroxide, was polymerized by procedure similar to that described in Example 6. In each experiment 2⅓ parts by weight of styrene were used per part of the alpha-methyl styrene and 1.86 parts by weight of linseed oil were used per part of tung oil. The mixture of the two drying oils had an average degree of conjugation of about 30 per cent. The ratio of the total weight of the styrenes, i. e. of styrene plus alpha-methyl styrene, to the total weight of the drying oils was varied from one experiment to another as indicated in Table II. The table gives the hours of heating at each of the successive temperatures of 150° C. and 200° C. in carrying out each polymerization reaction. All of the interpolymeric products were clear, transparent resins, readily soluble in toluene.

*Table II*

| Run No. | Wt. Ratio of Styrenes to Drying Oils | Hrs. of Heating at— | |
|---|---|---|---|
| | | 150° C. | 200° C. |
| 1 | 0.44 | 2 | 22 |
| 2 | 0.69 | 2 | 22 |
| 3 | 0.87 | 2.5 | 21.5 |
| 4 | 1.04 | 2 | 22 |
| 5 | 1.28 | 2.5 | 21.5 |
| 6 | 1.58 | 2.5 | 21.5 |
| 7 | 1.58 | 0.5 | 23.5 |

EXAMPLE 9

In each of two experiments, a mixture of 30.4 parts of linseed oil, 7.6 parts of tung oil, 2 parts of benzoyl peroxide, and 60 parts of styrene plus alpha-methyl styrene was heated at 150° C. for from 2 to 2¼ hours and then at 200° C. for from 21¾ to 22 hours to effect polymerization. The experiments differed with regard to the relative proportions of styrene and alpha-methyl styrene employed in the polymerization mixtures. In one of the experiments there were employed 36 parts of styrene and 24 parts of alpha-methyl styrene. In the other experiment there were employed 45 parts of styrene and 15 parts of alpha-methyl styrene. Each polymerization resulted in formation of a clear, transparent resin which is readily soluble in toluene.

This application is a continuation-in-part of our copending application, Serial No. 649,781, filed February 23, 1946, now abandoned.

Other modes of applying the principle of the invention may be employed instead of those explained, change being made in the method or products herein disclosed, provided the steps or substances stated by any of the following claims or the equivalent of such stated steps or substances be employed.

We therefore particularly point out and distinctly claim as our invention:

1. In a method for making a varnish resin, the step of interpolymerizing from 30 to 90 parts by weight of drying oil, having an average degree of conjugation not greater than would correspond to 35 per cent of its total olefinic unsaturation, and from 70 to 10 parts of a mixture consisting of from 50 to 80 per cent by weight of a monovinyl aromatic compound having the general formula:

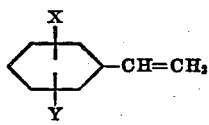

and from 50 to 20 per cent of an alpha-methylene alkyl aromatic compound having the general formula:

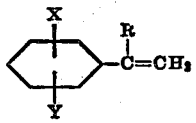

in which formulas X and Y each represents a member of the group consisting of hydrogen, halogens and lower alkyl radicals containing not more than three carbon atoms and R represents an alkyl radical containing not more than two carbon atoms, by heating the polymerization mixture at temperatures between 120° C. and 300° C.

2. A method, as described in claim 1, wherein the alpha-methylene alkyl aromatic compound is employed in amount corresponding to between 20 and 40 per cent of the combined weight of the same and the monovinyl aromatic compound, and the polymerization is carried out in the substantial absence of added solvents.

3. A method, as described in claim 2, wherein the monovinyl aromatic compound is styrene.

4. A method, as described in claim 2, wherein the alpha-methylene alkyl aromatic compound is alpha-methyl styrene.

5. A method, as described in claim 2, wherein the drying oil has an average degree of conjugation not greater than 30 per cent.

6. A method, as described in claim 2, wherein the monvinyl aromatic compound is styrene, the alpha-methylene alkyl aromatic compound is alpha-methyl styrene, the drying oil has an average degree of conjugation not exceeding 30 per cent, and the polymerization is carried out at temperatures between 150° and 200° C. while preventing free access of air to the mixture.

7. A toluene-soluble resinous interpolymer of (1) from 30 to 90 parts by weight of drying oil having an average degree of conjugation not greater than 35 per cent and (2) from 70 to 10 parts of a mixture consisting of from 50 to 80 per cent by weight of a monovinyl aromatic compound having the general formula:

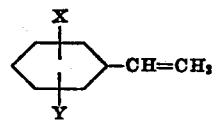

and from 50 to 20 per cent of an alpha-methylene alkyl aromatic compound having the general formula:

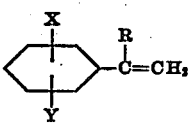

in which formulas X and Y each represents a member of the group consisting of hydrogen, halogens, and alkyl radicals containing not more than three carbon atoms and R represents an alkyl radical containing not more than two carbon atoms.

8. A toluene-soluble resinous interpolymer of from 30 to 90 parts by weight of drying oil having an average degree of conjugation not exceeding 35 per cent, and from 70 to 10 parts of a mixture of styrene and alpha-methyl styrene in which the styrene represents from about 50 to about 80 per cent of the weight of said mixture of styrene and alpha-methyl styrene.

9. An interpolymer, as described in claim 8, wherein the drying oil is linseed oil.

10. An interpolymer, as described in claim 8, wherein the drying oil is dehydrated castor oil.

11. An interpolymer, as described in claim 8, wherein the drying oil is a mixture of linseed oil and tung oil in proportions such that the average degree of conjugation of the drying oil is not greater than 30 per cent.

12. A varnish comprising an interpolymer, as defined in claim 8, dissolved in a volatile solvent.

13. A process wherein a varnish resin prepared by the method of claim 1 is bodied by heating the same at a temperature above 250° C., but below its decomposition temperature.

GERALD A. GRIESS.
ARTHUR S. TEOT.

No references cited